(12) United States Patent
Zou et al.

(10) Patent No.: US 12,138,609 B2
(45) Date of Patent: Nov. 12, 2024

(54) COATED CHLORIDE SALT PARTICLES AND METHODS OF MAKING AND USING THE SAME

(71) Applicants: Khalifa University of Science and Technology, Abu Dhabi (AE); National Center of Meteorology, Al Shawamekh (AE)

(72) Inventors: Linda Yuan Zou, Abu Dhabi (AE); Mustapha Jouiad, Abu Dhabi (AE); Abdelali Zaki, Abu Dhabi (AE); Nabil El Hadri, Abu Dhabi (AE); Haoran Liang, Abu Dhabi (AE)

(73) Assignees: Khalifa University of Science and Technology, Abu Dhabi (AE); National Center of Meteorology, Al Shawamekh (AE)

( * ) Notice: Subject to any disclaimer, the term of this patent is extended or adjusted under 35 U.S.C. 154(b) by 0 days.

(21) Appl. No.: 17/989,753

(22) Filed: Nov. 18, 2022

(65) Prior Publication Data
US 2023/0294062 A1      Sep. 21, 2023

Related U.S. Application Data

(62) Division of application No. 16/341,204, filed as application No. PCT/EP2017/075932 on Oct. 11, 2017, now Pat. No. 11,504,687.

(60) Provisional application No. 62/512,436, filed on May 30, 2017, provisional application No. 62/406,414, filed on Oct. 11, 2016.

(51) Int. Cl.
*B01J 13/02*      (2006.01)
*A01G 15/00*    (2006.01)
*C01D 3/04*      (2006.01)

(52) U.S. Cl.
CPC .............. *B01J 13/02* (2013.01); *A01G 15/00* (2013.01); *C01D 3/04* (2013.01); *C01P 2002/72* (2013.01); *C01P 2002/82* (2013.01); *C01P 2004/03* (2013.01); *C01P 2004/84* (2013.01)

(58) Field of Classification Search
CPC ................................. C01D 3/04; A01G 15/00
See application file for complete search history.

(56) References Cited

U.S. PATENT DOCUMENTS

| | | | |
|---|---|---|---|
| 3,659,785 A | 5/1972 | Nelson et al. | |
| 5,478,460 A | 12/1995 | Sugama et al. | |
| 5,814,501 A * | 9/1998 | Becker ................... | C12N 11/14 |
| | | | 435/174 |
| 2002/0098529 A1 | 7/2002 | Tan et al. | |

(Continued)

FOREIGN PATENT DOCUMENTS

| WO | 9815301 A1 | 4/1998 |
|---|---|---|
| WO | 0188540 A1 | 11/2001 |
| WO | 03022267 A1 | 3/2003 |

OTHER PUBLICATIONS

First Substantive Examination Report for KSA Application No. 519401560 mailed on Sep. 1, 2022 (17 pages).

(Continued)

*Primary Examiner* — Peter F Godenschwager
(74) *Attorney, Agent, or Firm* — Billion & Armitage

(57) ABSTRACT

Described herein are coated chloride salt particles, including $NaCl/TiO_2$ and $NaCl/SiO_2$ core/shell particles, along with methods of making and using the same.

20 Claims, 10 Drawing Sheets

(56) References Cited

U.S. PATENT DOCUMENTS

2006/0013750 A1 1/2006 Martin et al.
2009/0246674 A1 10/2009 Carlini et al.

OTHER PUBLICATIONS

International Search Report and Written Opinion for PCT Application No. PCT/EP2017/075932 mailed on Feb. 28, 2018, 19 pages.
Tan, Peng , et al., "Core-Shell AgCl@SiO2 Nanoparticles: Ag(I)-Based Antibacterial Materials with Enhanced Stability", ACS Sustainable Chem. Eng., 4, 6, 3268-3275, May 3, 2016.

* cited by examiner

PURE SALT USED FOR CLOUD SEEDING

NaCl/TiO$_2$ COMPOSITE USED FOR CLOUD SEEDING

COATED CHLORIDE SALT PARTICLES AND METHODS OF MAKING AND USING THE SAME

RELATED APPLICATION INFORMATION

This application is a divisional of Ser. No. 16/341,204, filed on Apr. 11, 2019, which is a National Stage Application of PCT/EP2017/075932, filed on Oct. 11, 2017, which claims the benefit of U.S. Provisional Patent Application Ser. No. 62/406,414, filed Oct. 11, 2016, and U.S. Provisional Patent Application Ser. No. 62/512,436, filed May 30, 2017, the disclosure of each of which is incorporated herein by reference in its entirety.

FIELD

The present invention relates to coated chloride salt particles, including $NaCl/TiO_2$ and $NaCl/SiO_2$ core/shell particles, along with methods of making and using the same, including methods of using the particles in cloud seeding.

BACKGROUND

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly nor impliedly admitted as prior art against the present disclosure.

When water vapor is largely present in the atmosphere, it offers the possibility of a valuable fresh water source. It can be harvested by using condensation methods to change from gaseous state to liquid state. It is known that, under the conditions of supersaturation in the atmosphere, the formation of water droplets occurs using a heterogeneous nucleation process, which requires the presence of ultrafine particles. Cloud or fog formation is not possible without the existence of submicron-sized particles in the atmosphere. Furthermore, the ultrafine particles attract the microscopic cloud moisture then to form large water droplets around their surface by collision-coalescence and if the size of the final droplets is big enough, the water droplets will fall as rain precipitation. The ultrafine particles that nucleate the liquid cloud droplets are known as cloud condensation nuclei (CCN), while particles that stimulate the formation of ice crystals are named as ice nuclei (IN), by which the cloud seeding science interfere to these issues. Two cloud seeding methods are employed in practice: hygroscopic cloud seeding and glaciogenic cloud seeding.

Fine particles play an important role in condensing water vapor in the atmosphere into water droplets for rainfall.

SUMMARY OF THE INVENTION

One aspect of the present invention is directed to a particle comprising a core and a shell, wherein the core comprises a chloride salt (e.g., sodium chloride and/or potassium chloride) and the shell comprises titanium dioxide and/or silicon dioxide. In some embodiments, the shell comprises titanium dioxide. In some embodiments, the shell comprises silicon dioxide.

An additional aspect of the present invention is directed to a method of using a particle as described herein to increase precipitation formation and/or for cloud seeding.

Another aspect of the present invention is directed to a method of preparing chloride salt particles, the method comprising: adding a chloride salt solution (e.g., a sodium chloride and/or potassium chloride solution) to an organic solvent (e.g., an alcohol and/or ketone) while mixing to form a mixture comprising a precipitate; and isolating the precipitate to provide the chloride salt particles.

A further aspect of the present invention is directed to a method of preparing core-shell particles, the method comprising: suspending chloride salt particles (e.g., sodium chloride and/or potassium chloride particles) in an organic solvent (e.g., an alcohol and/or ketone) to provide a suspension; and adding a titanium dioxide or silicon dioxide composition (e.g., a sol solution and/or gel) to the suspension to form a mixture comprising core-shell particles, thereby preparing the core-shell particles.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EXAMPLE EMBODIMENTS

Figure 1:
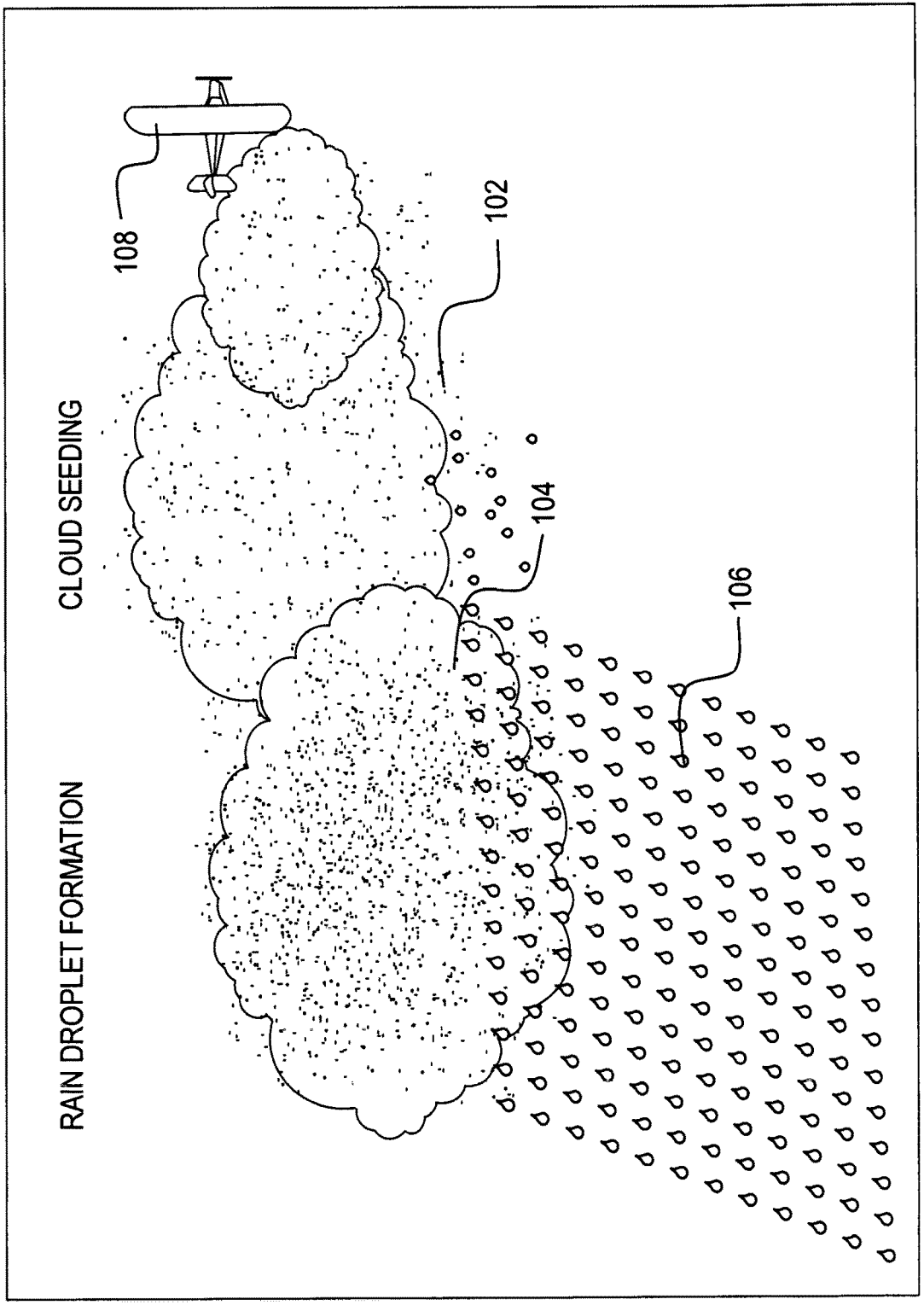
FIG. 1 illustrates a clouding seeding and rain formation process according to embodiments of the present invention.
Figure 2:
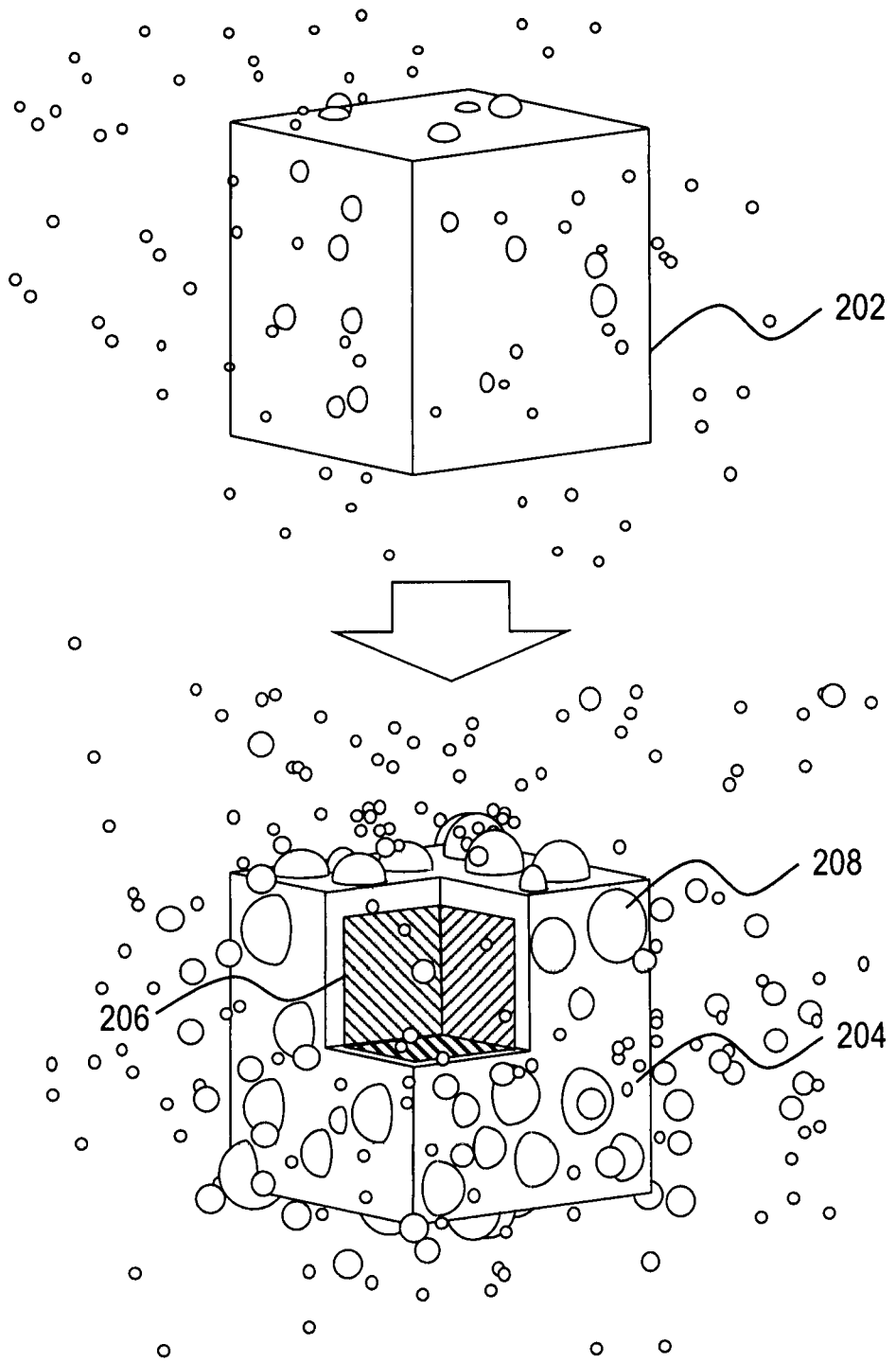
FIG. 2 is an illustration of the effect of a titanium dioxide coating on water vapor adsorption and water droplet formation according to embodiments of the present invention.
Figure 3:
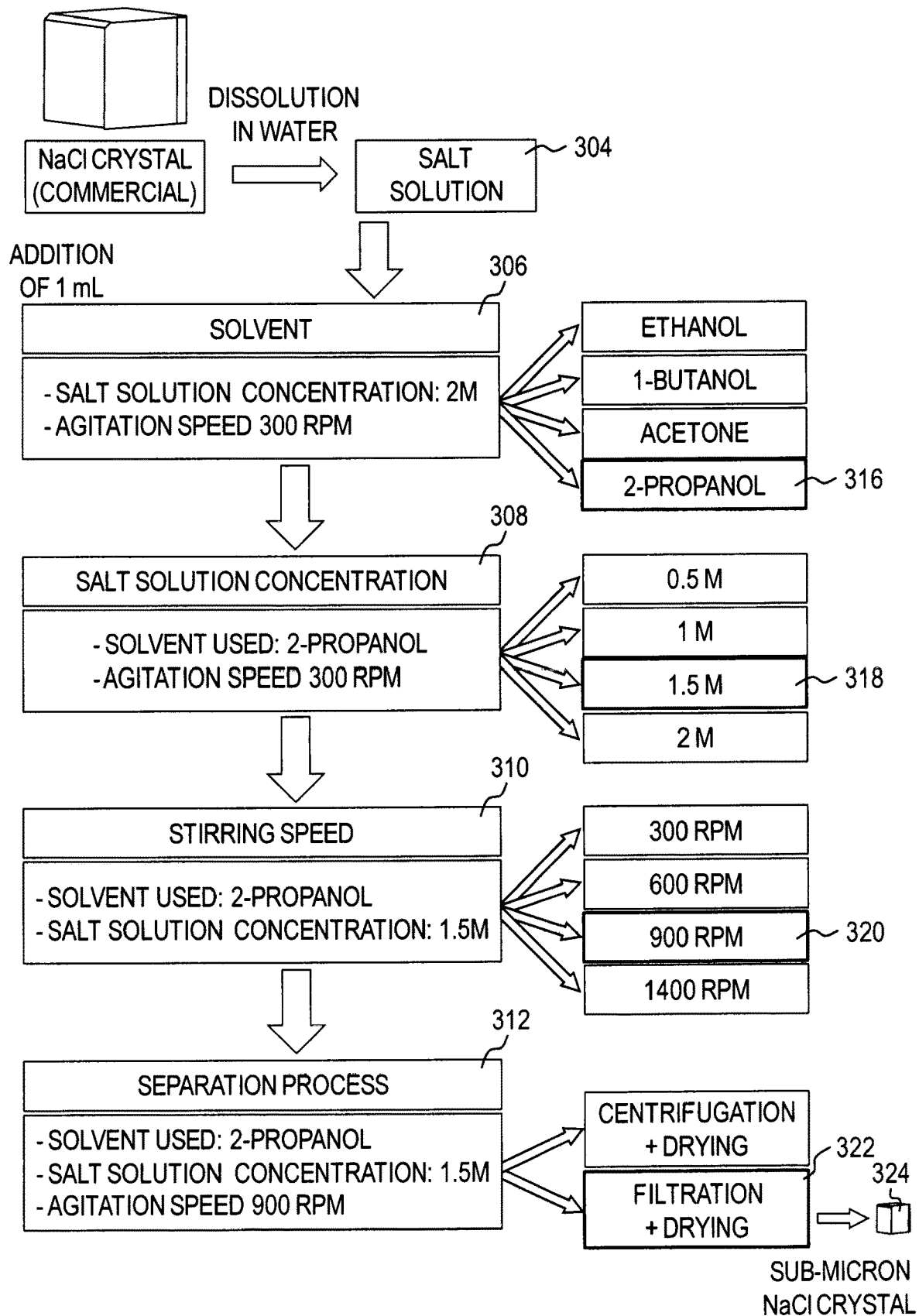
FIG. 3 illustrates a flowchart of different parameters studied to obtain sub-micron salt crystals according to embodiments of the present invention.
Figure 4:
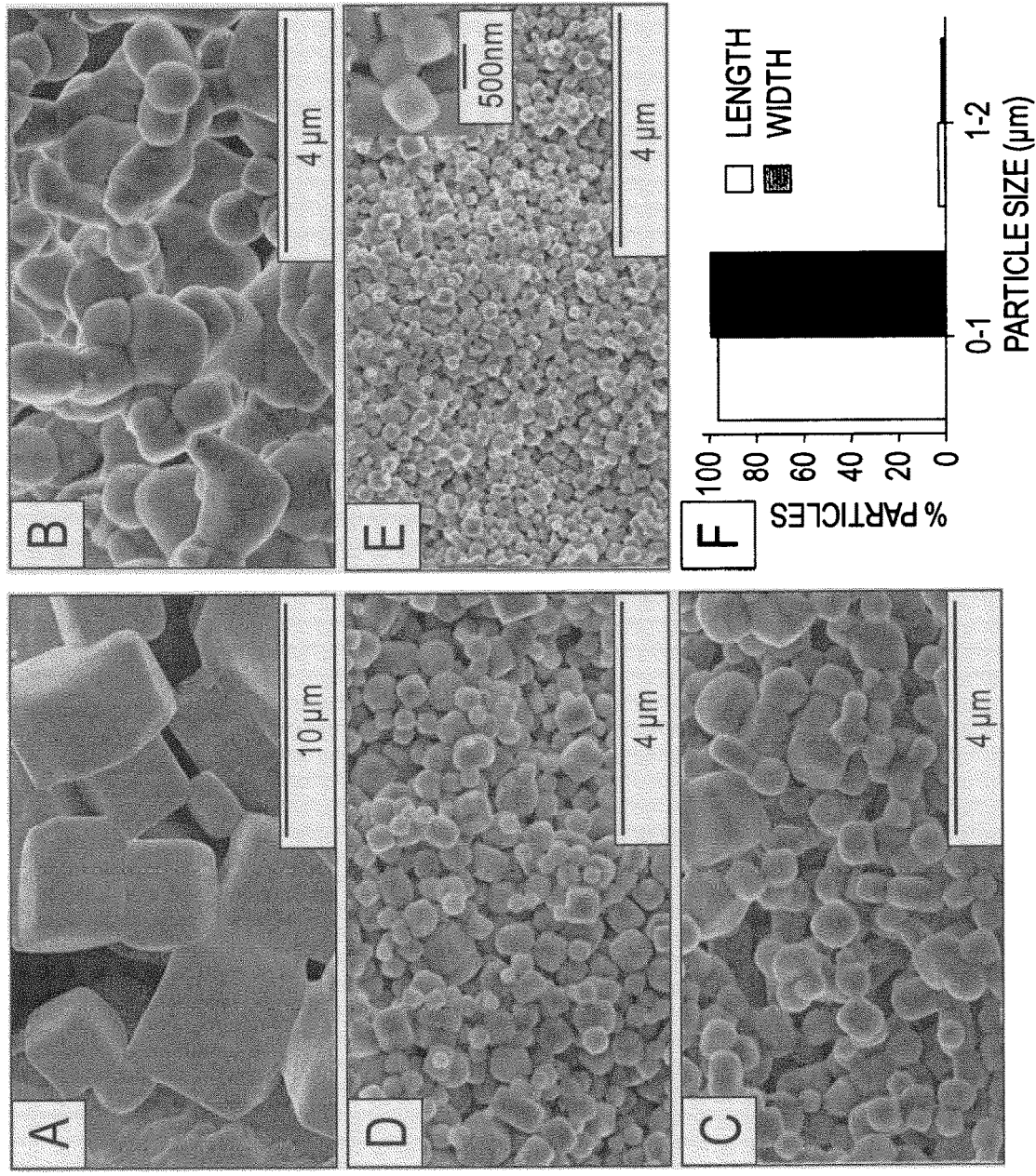
FIG. 4 shows SEM micrographs of (a) Pure salt (commercial); (b) intermediate optimized NaCl crystals using 2-propanol; (c) NaCl crystals obtained with a 1.5 M salt solution concentration; (d) NaCl crystals obtained with a stirring speed of 900 rpm; (e) sub-micron NaCl crystals; and (f) size distribution of sub-micron NaCl crystals.
Figure 5:
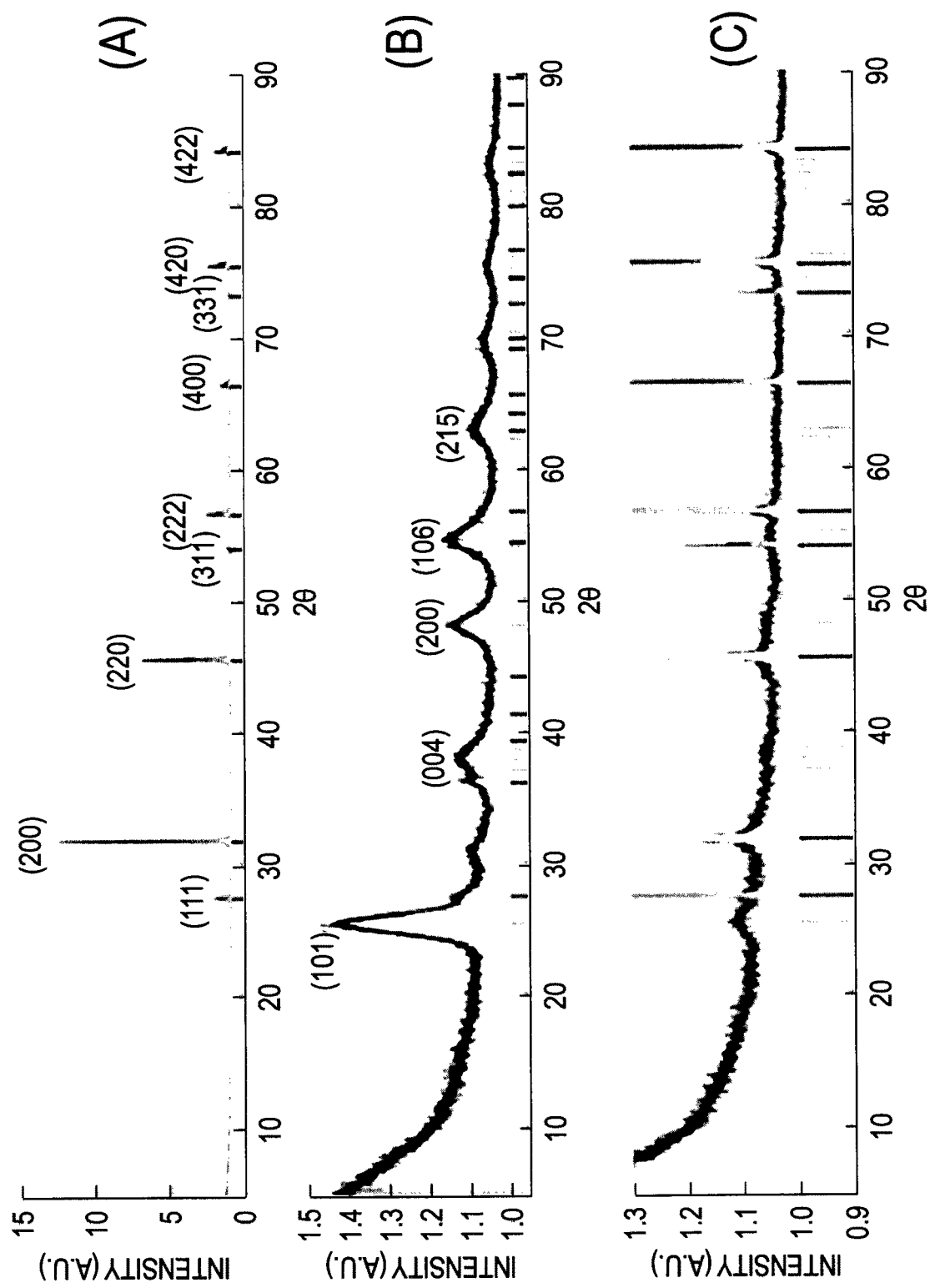
FIG. 5 illustrates XRD patterns of (a) NaCl powder and the matching peaks; (b) $TiO_2$ powder and the matching peaks: anatase structure and rutile; and (c) Zoom-in on the XRD patterns of $NaCl—TiO_2$ composite and the matching peaks of $TiO_2$ anatase and NaCl.
Figure 6:
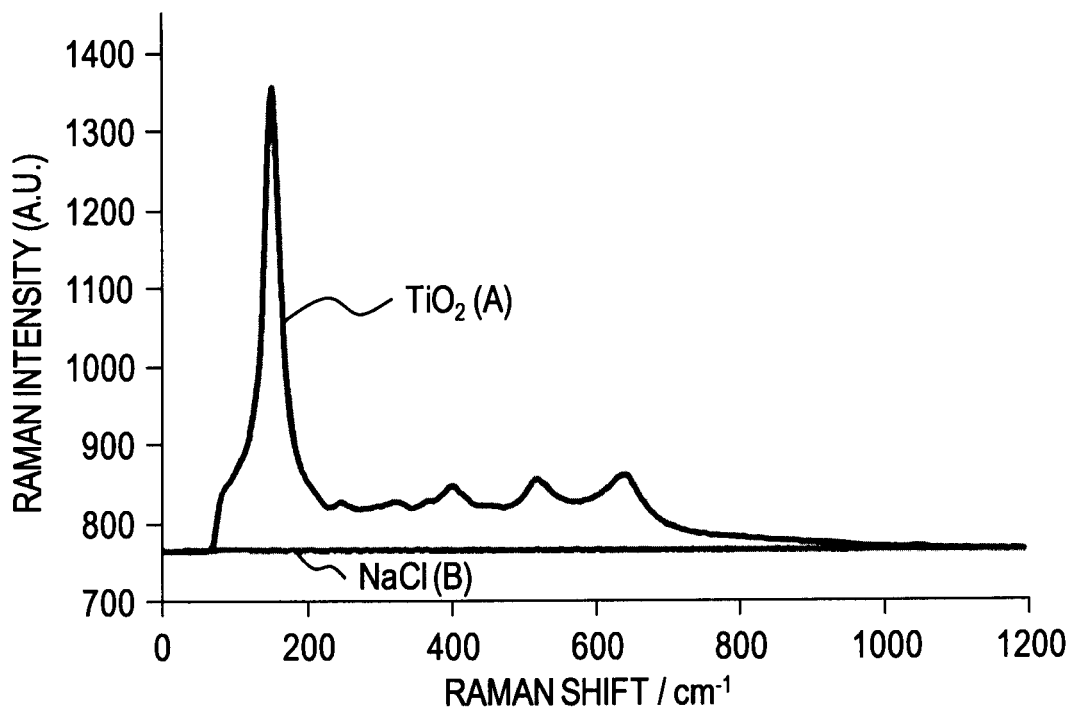
FIG. 6 shows the Raman spectrum of (a) pure NaCl powder; (b) pure $TiO_2$ powder and (c) $NaCl/TiO_2$ composite.
Figure 6:
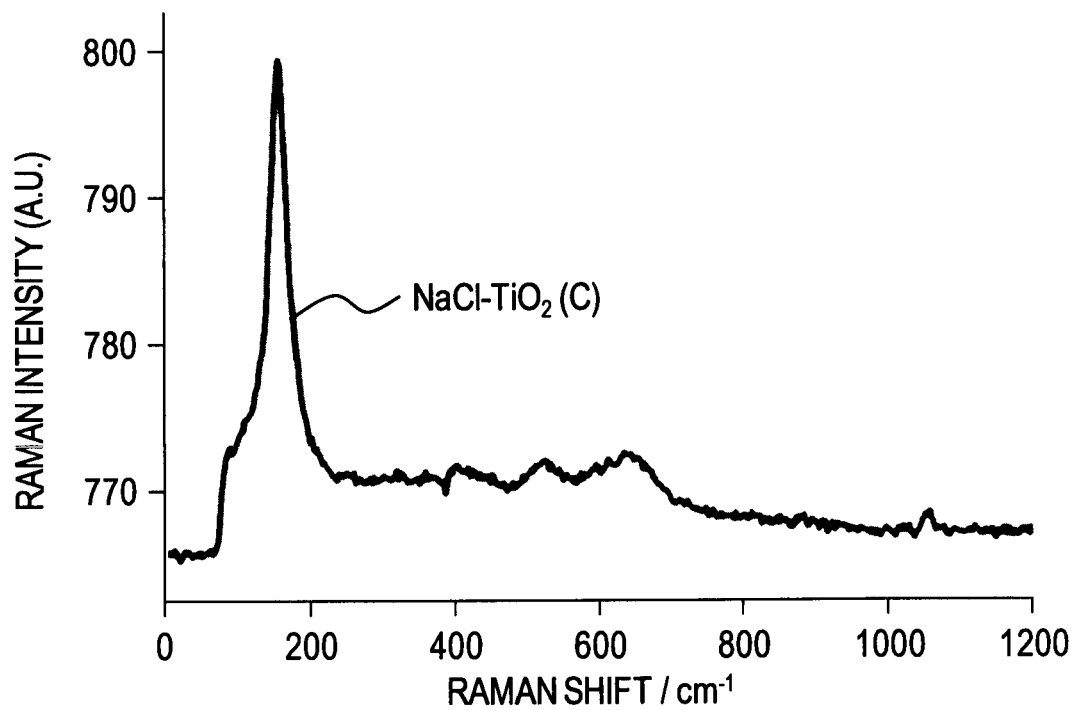

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular embodiments only and is not intended to be limiting of the invention. All publications, patent applications, patents and other references mentioned herein are incorporated by reference in their entirety. In case of a conflict in terminology, the present specification is controlling.

Also as used herein, "and/or" refers to and encompasses any and all possible combinations of one or more of the associated listed items, as well as the lack of combinations when interpreted in the alternative ("or").

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a complex comprises components A, B and C, it is specifically intended that any of A, B or C, or a combination thereof, can be omitted and disclaimed.

As used herein, the transitional phrase "consisting essentially of" (and grammatical variants) is to be interpreted as encompassing the recited materials or steps "and those that do not materially affect the basic and novel characteristic(s)" of the claimed invention. See, In re Herz, 537 F.2d 549, 551-52, 190 U.S.P.Q. 461, 463 (CCPA 1976) (emphasis in the original); see also MPEP § 2111.03. Thus, the term "consisting essentially of" as used herein should not be interpreted as equivalent to "comprising."

The term "about," as used herein when referring to a measurable value such as an amount or concentration and the like, is meant to encompass variations of ±10%, ±5%, ±1%, ±0.5%, or even ±0.1% of the specified value as well as the specified value. For example, "about X" where X is the measurable value, is meant to include X as well as variations of ±10%, ±5%, ±1%, ±0.5%, or even ±0.1% of X. A range provided herein for a measureable value may include any other range and/or individual value therein.

As used herein, the terms "increase." "increases," "increased," "increasing", "improve", "enhance", and similar terms indicate an elevation in the specified parameter of at least about 5%, 10%, 15%, 20%, 25%, 30%, 35%, 40%, 45%, 50%, 55%, 60%, 65%, 70%, 75%, 80%, 85%, 90%, 95%, 100%, 150%, 200%, 300%, 400%, 500% or more.

As used herein, the terms "reduce." "reduces," "reduced," "reduction", "inhibit", and similar terms refer to a decrease in the specified parameter of at least about 5%, 10%, 15%, 20%, 25%, 30%, 35%, 40%, 45%, 50%, 55%, 60%, 65%, 70%, 75%, 80%, 85%, 90%, 95%, 97%, or 100%.

Provided according to embodiments of the present invention are particles along with methods of making and using such particles. In some embodiments, cloud seeding materials are provided, which may be used to promote and/or increase rainfall. The cloud seeding material may have a size of a few microns. In some embodiments, the particle has a hygroscopic core and a hydrophilic shell.

A particle of the present invention may comprise a core and a shell, wherein the core comprises a chloride salt (e.g., sodium chloride and/or potassium chloride) and the shell comprises titanium dioxide and/or silicon dioxide. In some embodiments, the core comprises sodium chloride. The particle may be hygroscopic.

In some embodiments, the particle is a nanostructured particle and/or a nanoparticle. "Nanostructured" as used herein in reference to a particle means that the particle has at least one dimension that is on the nanoscale (e.g., the diameter is less than 1 micron, such as, e.g., 10 nm or 500 nm). In some embodiments, the particle has a cubic size, size distribution, and/or diameter in a range of about 100, 400, or 500 nm to about 1000 or 1000 nm. In some embodiments, the particle has a size, size distribution, and/or diameter of a few microns, such as, for example, about 10 microns or less. In some embodiments, the particle has a size, size distribution, and/or diameter of about 1, 2, 3, 4, 5, 6, 7, 8, 9, or 10 microns. In some embodiments, the particles may have a size, size distribution, and/or diameter in a range of about 100 or 500 nanometers to about 10 microns. In some embodiments, the particles may have a size, size distribution, and/or diameter in a range of about 400 nm to about 8 microns. In some embodiments, a plurality of particles is provided and at least a portion (e.g., 10%, 15%, 20%, 25%, 30%, 35%, 40%, 45%, 50%, or more of the plurality) has a size and/or diameter in a range of about 1 micron to about 2 microns or about 2 microns to about 3 microns.

The shell of a particle of the present invention may be present in an amount of about 0.5% to about 20% by weight of the particle. In some embodiments, the particle may comprises a shell in an amount of about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%. 13.5%, 14%, 14.5%, 15%, 15.5%, 16%, 16.5%, 17%, 17.5%, 18%, 18.5%, 19%, 19.5%, or 20% by weight of the particle. The shell may have a thickness in a range of about 1 nm to about 50 nm. In some embodiments, the particle may comprises a shell havening a thickness of about 1, 5, 10, 15, 20, 25, 30, 35, 40, 45, or 50 nm. In some embodiments, the shell may be hydrophilic.

The shell or coating of a particle of the present invention may comprise amorphous and/or crystalline titanium dioxide and/or silicon dioxide. In some embodiments, the shell comprises crystalline titanium dioxide, such as, e.g., anatase and/or rutile. In some embodiments, the shell comprises crystalline silicon dioxide, such as, e.g., α-quartz, β-quartz, α-tridymite, β-tridymite, α-cristobalite, β-cristobalite, keatite, moganite, coesite, stishovite, seifertite, and/or melanophlogite. In some embodiments, the shell comprises amorphous titanium dioxide and/or amorphous silicon dioxide.

In some embodiments, a particle of the present invention comprises titanium dioxide and/or silicon dioxide that has a grain size in a range of about 1 nm to about 10 nm. The grain size may be about 1, 1.5, 2, 2.5, 3, 3.5, 4, 4.5, 5, 5.5, 6, 6.5, 7, 7.5, 8, 8.5, 9, 9.5, or 10 nm.

A particle of the present invention may have a water vapor adsorption capacity that is greater than the water vapor adsorption capacity of a chloride salt particle (e.g. an uncoated chloride salt (e.g., sodium and/or potassium chloride) particle, a pure chloride salt particle and/or a particle consisting of a chloride salt), optionally of the same or substantially the same size. In some embodiments, a particle of the present invention has a water vapor adsorption capacity that is at least 2, 5, 10, 20, 30, 40, 50, 60, 70, 80, 90, 100, 110, 120, 130, 140, or 150 times greater than the water vapor adsorption capacity of a chloride salt particle (e.g. an uncoated chloride salt (e.g., sodium and/or potassium chloride) particle, a pure chloride salt particle and/or a particle consisting of a chloride salt), optionally of the same or substantially the same size.

A particle of the present invention may have a water vapor adsorption capacity that is greater than about 0.37 $cm^3/g$. In some embodiments, the particle has a water adsorption capacity in a range of about 0.4 or 1 $cm^3/g$ to about 100 $cm^3/g$. The particle may have a water adsorption capacity of about 1, 5, 10, 15, 20, 25, 30, 35, 40, 45, 50, 55, 60, 65, 70, 75, 80, 85, 90, 95 or 100 $cm^3/g$.

A particle of the present invention may adsorb water. In some embodiments, the particle may adsorb water when in an environment having a relative water vapor pressure of about 1, 0.9, 0.8, 0.7, 0.6, 0.5, 0.4, 0.3, 0.2, or 0.1 $P/P_0$. In some embodiments, the particle may adsorb water when in an environment having a relative water vapor pressure of less than 0.75 $P/P_0$, such as, e.g., less than about 0.5, 0.25, or 0.1 $P/P_0$. In some embodiments, the particle may adsorb water when in an environment having a relative water vapor pressure in a range of about 0.05 $P/P_0$ or greater, such as, e.g., about 0.1, 0.2, 0.3, 0.4, 0.5, 0.6, 0.7, 0.8, 0.9, 1 $P/P_0$ or greater.

A particle of the present invention may have a hygroscopic point that is decreased compared to a chloride salt particle (e.g., an uncoated chloride salt (e.g., sodium and/or potassium chloride) particle, a pure chloride salt particle and/or a particle consisting of a chloride salt). The hygroscopic point may be decreased by at least about 10%, 25%, 50%, 75%, 90%, or 100% compared to a chloride salt particle (e.g., an uncoated sodium chloride particle).

According to some embodiments of the present invention, a method of using a particle of the present invention may be provided. In some embodiments, a method of using a particle of the present invention for cloud seeding (e.g., warm cloud seeding) is provided. In some embodiments, a method of increasing precipitation (e.g., rain and/or snow) and/or rain formation is provided comprising contacting a cloud and/or cloud moisture with a particle of the present invention. A method of the present invention may comprise providing and/or forming water condensation, which is then turned into ice particles/nuclei. In some embodiments, a particle of the present invention increases the amount of ice particles and/or precipitation formed compared to the amount of ice particles and/or precipitation formed in the absence of the present invention and/or with a conventional seeding agent (e.g., an uncoated sodium and/or potassium chloride particle, silver iodide, potassium iodide, dry ice, or liquid propane). In some embodiments, a method of the present invention increases the size and/or rate of precipitation formation.

In some embodiments, a particle of the present invention is a nanostructured particle having a core-shell structure of NaCl coated with a thin layer of $TiO_2$ nanoparticles (NaCl/$TiO_2$) or $SiO_2$ (NaCl/$SiO_2$). When the $TiO_2$ loading of the composite is increased, the specific water vapor adsorption capacity of the NaCl/$TiO_2$ may be increased. It was found that NaCl/5% $TiO_2$ composites had a much higher water adsorption capacity of 47.72 $cm^3/g$ than pure NaCl of 0.37 $cm^3/g$, which meant that 129 times more water vapor was adsorbed by NaCl/$TiO_2$ composites than by pure NaCl. It was also found that NaCl/$SiO_2$ particles adsorbed a total of 11 $cm^3/g$ of water vapor, which is 32 times higher than the volume adsorbed by pure salt. The addition of $TiO_2$ or $SiO_2$ in the surface layer of pure salt may improve the hygroscopicity of the particle so it may adsorb more water vapor. The hydrophilic $TiO_2$ or $SiO_2$ thin coating helped to increase the water vapor pressure so as to reduce the hydroscopic point of the composites. The results described herein demonstrate that particles of the present invention (e.g., NaCl/$TiO_2$ nanocomposite particles) can adsorb water vapor in a wide range of vapor pressures efficiently and may promote the formation of larger water droplets for rain fall. Particles of the present invention can be a suitable alternative for cloud seeding applications.

In some embodiments, a submicron-sized particle having improved hygroscopic properties compared to an uncoated sodium chloride particle is provided. The particle comprises a NaCl core that is encapsulated in a titanium dioxide ($TiO_2$) shell that may be provided in an amount of about 1.5% to about 5.0% of the total percentage by weight of the particle. In some embodiments, the average thickness of the $TiO_2$ shell is about 20 nm of cube whose cubic size ranged from about 500 to about 800 nm. In some embodiments, the NaCl/$TiO_2$ submicron particles may have enhanced or increased water vapor adsorption capacity ranging from about 25 times to about 130 times the amount of water vapor adsorption capacity of NaCl particles of a similar size.

Provided according to some embodiments of the present invention is a method of preparing chloride salt particles, the method comprising adding a chloride salt solution (e.g., a sodium and/or potassium chloride solution) to an organic solvent (e.g., an alcohol and/or ketone) while mixing to form a mixture comprising a precipitate; and isolating the precipitate to provide the chloride salt particles (e.g., sodium chloride particles). In some embodiments, the organic solvent is an alcohol, such as, but not limited to, 2-propanol, ethanol, and/or 1-butanol. In some embodiments, the organic solvent is a ketone, such as, but not limited to, acetone.

The chloride salt solution may have a molarity in a range of about 0.5 M to about 2 M. In some embodiments, the chloride salt solution has a molarity of about 0.5, 0.75, 1, 1.25, 1.5, 1.75, or 2 M. In some embodiments, the chloride salt solution has a molarity of about 1.5 M.

The chloride salt solution may be added to the organic solvent (e.g., an alcohol and/or ketone) in a volume ratio in a range of about 1:10 to about 1:100 (chloride salt solution: organic solvent). In some embodiments, the chloride salt solution may be added to the organic solvent in a volume ratio of about 1:10, 1:20, 1:30, 1:40, 1:50, 1:60, 1:70, 1:80, 1:90, or 1:100. In some embodiments, the chloride salt solution may be added to the organic solvent in a volume ratio of about 1:50 (chloride salt solution:organic solvent).

The step of adding a chloride salt solution to an organic solvent may be carried out while mixing at any suitable speed. In some embodiments, the mixing is carried out at a speed in a range of about 500 rpm to about 1500 rpm. In some embodiments, the mixing is carried out at a speed of about 500, 600, 700, 800, 900, 1000, 1100, 1200, 1300, 1400, or 1500 rpm. In some embodiments, the mixing is carried out at a speed of about 900 rpm.

The step of isolating the precipitate to provide the chloride salt particles may be carried out using any method know to those of skill in the art. In some embodiments, isolating the precipitate to provide the chloride salt particles may comprise filtering the mixture.

The method of preparing the chloride salt particles may further comprise drying the precipitate. The chloride salt particles may have a cubic size in a range of about 500 nm to about 1000 nm. In some embodiments, the chloride salt particles may have a cubic size of about 500, 550, 600, 650, 700, 750, 800, 850, 900, 950, or 1000 nm.

Some embodiments of the present invention include a method of preparing a core-shell particle of the present invention, the method comprising suspending chloride salt particles in an organic solvent to provide a suspension; and adding a titanium dioxide or silicon dioxide composition to the suspension to form a mixture comprising core-shell particles, thereby preparing the core-shell particles. In some embodiments, the chloride salt particles are prepared according to an embodiment of the present invention.

The method of preparing the core-shell particle may comprise suspending the chloride salt particles in the organic solvent for period of time, such as, e.g., about 10 minutes to about 60 minutes. In some embodiments, the chloride salt particles are suspended in the organic solvent for about 10, 15, 20, 25, 30, 25, 40, 45, 50, 55, or 60 minutes. In some embodiments the alcohol is 2-propanol, ethanol, and/or 1-butanol. In some embodiments, the ketone is acetone.

The titanium dioxide or silicon dioxide composition may have a pH of about 2 or less. In some embodiments, the titanium dioxide or silicon dioxide composition may have a pH of about 2, 1.8, 1.6, 1.4, 1.2, or 1. In some embodiments, the titanium dioxide or silicon dioxide composition is a sol gel.

The method of preparing the core-shell particle may comprise removing the core-shell particles from the mixture, such as, e.g., by filtering and/or centrifuging the mixture to remove the core-shell particles from the mixture. In some embodiments, the method comprises drying the suspension and/or core-shell particles. The method may comprise crystallizing titanium dioxide and/or silicon dioxide. In some embodiments, the method comprises calcining the core-shell particles, such as, e.g., at a temperature in a range of about 200° C. to about 300° C. for at least 1 hour.

In some embodiments, a method is provided for preparing submicron-sized NaCl/TiO$_2$ composite particles with improved hygroscopic properties. The method may start with the preparation of submicron-sized NaCl particles prepared by adding one volume of NaCl solution, (e.g., a 1.5 M NaCl solution) to 50 volumes of 2-propanol that is being stirred at a speed of about 900 rpm. After which a precipitate (e.g., a white precipitate) may appear. The precipitate may be collected by either centrifugation and/or filtration. In some embodiments, the collected crystals may be subjected to drying. The NaCl crystals collected may be sub-micron cubic particles ranging in a size of about 500 nm to about 800 nm.

In some embodiments, the preparation of submicron-sized NaCl/TiO$_2$ composite particles is provided by suspending the collected NaCl crystals in 2-propanol for 30 minutes. A TiO$_2$ solution may be prepared by dispersing titanium butoxide in 2-propanol and adding dropwise a diluted solution of nitric acid until the pH of 2 or less was obtained. The TiO$_2$ pH 2.0 solution may be added dropwise into the NaCl crystal 2-propanol solution that has been stirred for 30 minutes at room temperature. The mixture may be stirred for another 30 minutes before filtering the final solution and drying at 80° C. overnight. To obtain NaCl/TiO$_2$ composites particles, the dried crystals may be calcined in air at 250° C. for 3 hours to crystallize the amorphous TiO$_2$.

Referring now to the drawings, wherein like reference numerals designate identical or corresponding parts throughout the several views, FIG. 1 illustrates an airborne seeding operation, during operations a suitable storm and/or cloud is located and/or identified, and an aircraft 108 carrying the seeding materials 102 is sent into the proper location in the storm and/or cloud, where the seeding materials are dispersed into the promising storm and/or cloud effectively 104.

Hygroscopic cloud seeding uses ultrafine particles such as salt crystals which can adsorb water vapor and attract tiny water droplets that are present in warm clouds. In a hygroscopic process, the water soluble crystals, such as sodium chloride, adsorb water vapor, and then are completely dissolved in it. Hygroscopicity is a property of a salt crystal to adsorb moisture from air, and is defined by their hygroscopic point, which is quantitatively described in equation (1). At the hygroscopic point, the salt crystals start to adsorb moisture or alternatively is described as the value of minimum water vapor concentration needed to carry an adsorption.

$$h_{g.p.} = \left(\frac{P_{salt}}{P_{H_2O}}\right) \times 100\% \tag{1}$$

Where $P_{salt}$ is the vapor pressure above the salt crystal sample, and $P_{H2O}$ is the pure water vapor pressure. A hygroscopic system consists of the following phases of condensations: a) dry salt crystals; b) a mixture of crystals and saturated solution; c) a saturated solution; d) an unsaturated dilute solution. The progression of condensation may also be dependent on the hydrophilic or hydrophobic surface characters of the cloud seeding materials. Hydrophilic particles promote the absorption of water and the droplets nucleation whereas the hydrophobic particles do not.

For a warmer cloud system, a collision-coalescence process occurs between fine water droplets, continued collisions lead to the formation of larger droplets, and eventually cause the water to fall to the ground as rain 106. In the atmosphere, rain droplets will not be formed without the naturally occurring condensation nuclei, such as dusts, pollens and salt from the ocean. Salt particles with hygroscopic nature such as sodium chloride and potassium chloride have been used to accelerate the water droplets to grow faster and larger into raindrops, i.e. enhance the rain formation. When salt particles (NaCl) are used for rain enhancement in the atmosphere that is slightly supersaturated with water vapor, if the water vapor contacts with the salt particle, will cause the dissolving of salt and create vapor pressure gradient, and become a condensation nuclei.

This approach has been practiced for decades. This mechanism applies to any changes of the particle surface, either by chemical reaction, or by agglomeration, will have the same nucleation effect. However, the condensation process stops when the vapor pressure gradient disappears.

The prevent invention includes the design and fabrication of hygroscopic particles for cloud condensation nuclei (cloud seeding materials) that can adsorb significantly more water vapor and/or are more efficient in water droplet formation compared to uncoated sodium chloride particles. The size of the particles of the present invention may range from submicron to a few micron. FIG. 2 illustrates the uncoated pure NaCl particles 202, whereas particles of the present invention 204 have a core-shell structure of NaCl coated with a thin layer of $TiO_2$ or $SiO_2$ 206, which can allow a water droplet 208 to form on the surface.

EXAMPLES

Example 1: Preparation of Sub-Micron NaCl Crystals

Commercially available salt particles have an average size that is larger than 4 μm, so a procedure was developed to prepare NaCl crystals having a submicron size. First, an aqueous NaCl solution was prepared, then 1 mL of the aqueous NaCl solution was added to 50 mL of 2-propanol solution while stirring. Once a white precipitate appeared, the mixture was then filtered, and the solid product obtained was dried in an oven. In order to control the size and morphology of the resultant particles, various synthesis parameters were investigated.

For the formation of the materials, the chemicals used were Sodium Chloride (NaCl) (extra pure, Sigma Aldrich), Ethanol (absolute 99.8% Sigma Aldrich), 1-butanol (reagent grade 99.4% Sigma Aldrich), Acetone (Sigma Aldrich).

FIG. 3 illustrates the optimized process used to obtain crystals 324 with desirable size and morphology from a commercial NaCl particle 302. The following parameters were optimized: (a) the type of solvent 306; (b) the NaCl solution concentration 308; (c) stirring speed 310; and (d) the separation process 312.

While not wishing to be bound to any particular theory, based on the experiments, it is believed that a solvent 306 having a low salt solubility when used with the salt solution 304 can limit the crystal growth and reduce the crystal size. The NaCl solution concentration 308 was examined and the results demonstrated that minimizing the solution concentration is believed to reduce salt nuclei in the solution. While not wishing to be bound to any particular theory, it is believed that the stirring speed can destabilize the crystal growth by creating limited media. Finally, the technique used to recover the NaCl powder affected the size of the crystals. By limiting the contact time between salt particles and solvent, it helped to stop the crystal growth in the residual solvent.

A series of NaCl crystals were obtained using different solvents including 2-propanol, acetone, ethanol, and 1-butanol. SEM was used to assess the sizes of these materials and provide feedback on the synthesis conditions. The addition of the aqueous salt solution 304 into organic solvent

306 led to salt crystals with more defined shapes compared to pure salt, FIG. 4(*a*). Based on the SEM images of the crystals, it was found that, when ethanol, acetone and 1-butanol were used as the organic solvent 306 in the process, the effect on reduction of crystal sizes was not significant. However, when 2-propanol, 316, was used, the size of crystals obtained was effectively reduced to around 1 micron FIG. 4(*b*). While not wishing to be bound to any particular theory, as the 2-propanol 316 was slowly diffused into water droplets, it is believed that this led to the localized supersaturation of NaCl and the critical initial nucleation at the surface of water droplets. The NaCl nuclei from the water droplets facilitated sustained uniform growth of NaCl single crystals. Accordingly, 2-propanol demonstrated to be a solvent that can effectively reduce the size of salt particles. However, the shape and morphology of the crystals prepared under these conditions were random sphere-like crystals, further optimization of the synthesis conditions was needed to obtain sharp, cubic shaped sub-micron crystals.

The second series of NaCl crystals was prepared with different concentrations of the salt solution, i.e. 0.5, 1M, 1.5M and 2M NaCl. The obtained SEM micrograph in FIG. 4(*c*) confirmed that the optimal NaCl concentration to produce submicron (around 1 micron) salt crystals was 1.5M, 318. By employing the optimal parameters obtained at this stage, including 2-propanol as solvent and a salt solution with molar concentration of 1.5M, a slightly more reduced crystal size in submicron range was obtained.

The growth of the crystals was affected by the diffusion rate of the ions, as the growth rate of the crystals was related to the concentration gradient around the interface of metastable water microdroplets. Experimentally, the ions for crystal growth were continuously supplied from the water microdroplets. In the areas close to the water microdroplets, the rate of the ion diffusion was relatively fast with respect to that of crystal growth, and the concentration of ions was relatively uniform. As a result, the growth took place at the entire crystal surfaces and was controlled by the crystal growth rate, this gave rise to a normal cube. However, in the areas far from the water microdroplets (the faces of the crystal that are toward outside), the rate of ion diffusion 310 was relatively slow with respect to the growth rate, and the growth became diffusion-limited, which resulted in less perfect crystal cubes.

In order to regulate the crystal growth rate to promote uniform growth of crystals, different stirring speeds were tried aiming to vary the ion diffusion conditions. Four speeds were investigated, 300, 600, 900 and 1500 rpm, respectively. When the rate of stirring was increased, a metastable state of salt solution was created which led to decrease in solution supersaturation condition. While not wishing to be bound to any particular theory, it is believed that stirring speed condition above 900 rpm, 320, can limit nucleation growth rate and allows a size decrease of the product crystals FIG. 4(*d*).

The optimized conditions used to prepare the NaCl crystals 324 entailed starting with 1.5 M NaCl solution where 1 ml of the solution is dissolved in 50 ml of 2-propanol being stirred at a speed of 900 rpm. Once white precipitates were observed, the precipitates were collected by either centrifuge or filtration methods. It was found that the NaCl crystals obtained from filtration followed by drying 322 presented shaped sub-micron cubic particles in size range of 500-800 nm×500-800 nm×500-800 nm, as revealed by SEM FIG. 4(*e*). The size distribution of the particles is shown in FIG. 4(*f*).

Example 2: Synthesis of NaCl/TiO$_2$ Core/Core-Shell Particles

The optimized NaCl cubic crystals were used to prepare sub-micron NaCl/TiO$_2$ particles. These particles were assessed by XRD in order to confirm the presence of TiO$_2$ and their crystalline phase.

To synthesis NaCl/TiO$_2$ core/shell composite particles, an acidified TiO$_2$ sol gel was prepared by hydrolysis of a titanium butoxide solution using nitric acid. Titanium dioxide (TiO$_2$) solution was prepared using titanium (IV) butoxide reagent grade, 97% (TBT, Sigma Aldrich), deionized water, and 2-propanol (extra pure, Sigma Aldrich) as the starting materials. First, solution A was prepared by dispersing titanium butoxide in 2-propanol. Next, solution B was prepared by mixing deionized water with nitric acid. Then, solution B was added dropwise into solution A under vigorous stirring until the formation of semitransparent TiO$_2$ sol and the pH of the TiO$_2$ sol was below 2. For the synthesis of NaCl/TiO$_2$ core/shell composite particles, NaCl crystals obtained previously were dispersed in 2-propanol for 30 min. Then, the below 2 pH of the TiO$_2$ sol was added dropwise into the NaCl/2-propanol solution with stirring for 30 minutes at room temperature. The mixture was stirred for another 30 minutes and was then dried at 80° C. for 3 hours. The solids were calcined in air at 250° C. for 3 hours to crystallize the amorphous TiO$_2$, and finally NaCl—TiO$_2$ composites were obtained. The size of the coated particles ranges from submicron to few microns.

While not wishing to be bound to any particular theory, the pH is believed to be the most important parameter controlling the TiO$_2$ particles size. When the pH value was less than 2, particles that were smaller than 20 nm were obtained. This strict size control helped so that, after coating, the overall size of the NaCl/TiO$_2$ particles was within submicron range.

Figure 7:
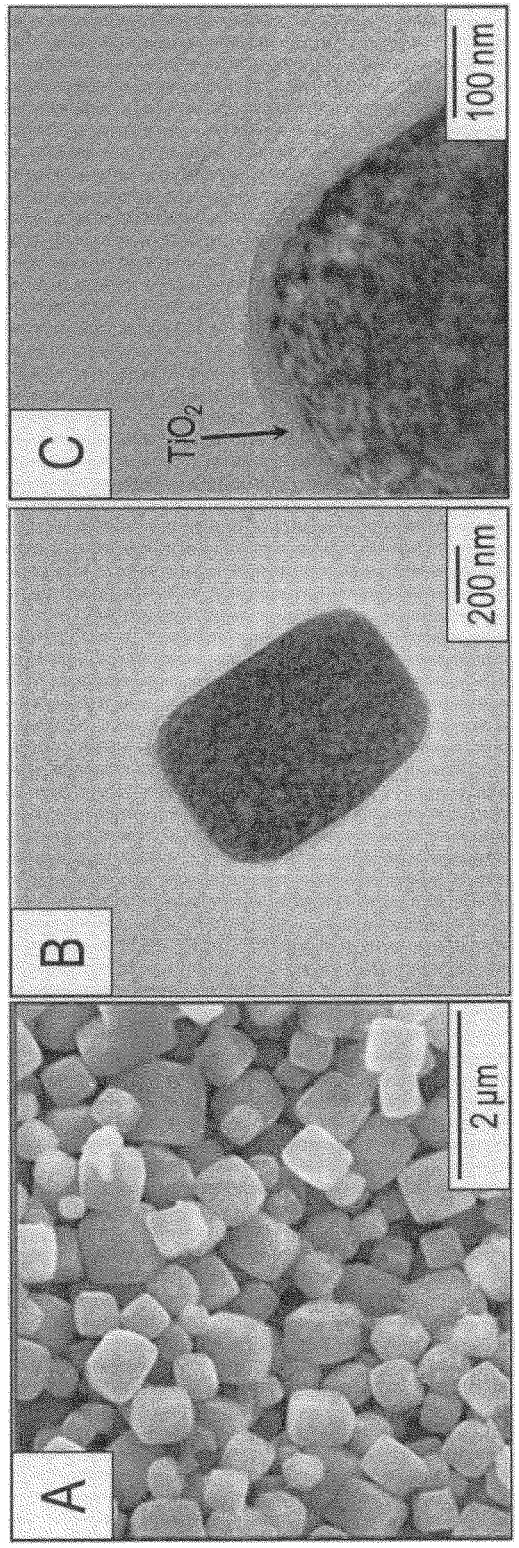
FIG. 7 illustrates (a) a SEM micrograph of a $NaCl/TiO_2$ composite; (b) a TEM micrograph of one $NaCl/TiO_2$ composite crystal with low magnification; (c) a TEM micrograph for the selected composite crystal at a higher magnification which shows the $TiO_2$ layer; and (d) EDS spectrum of the $NaCl/TiO_2$ composite.
Figure 7:
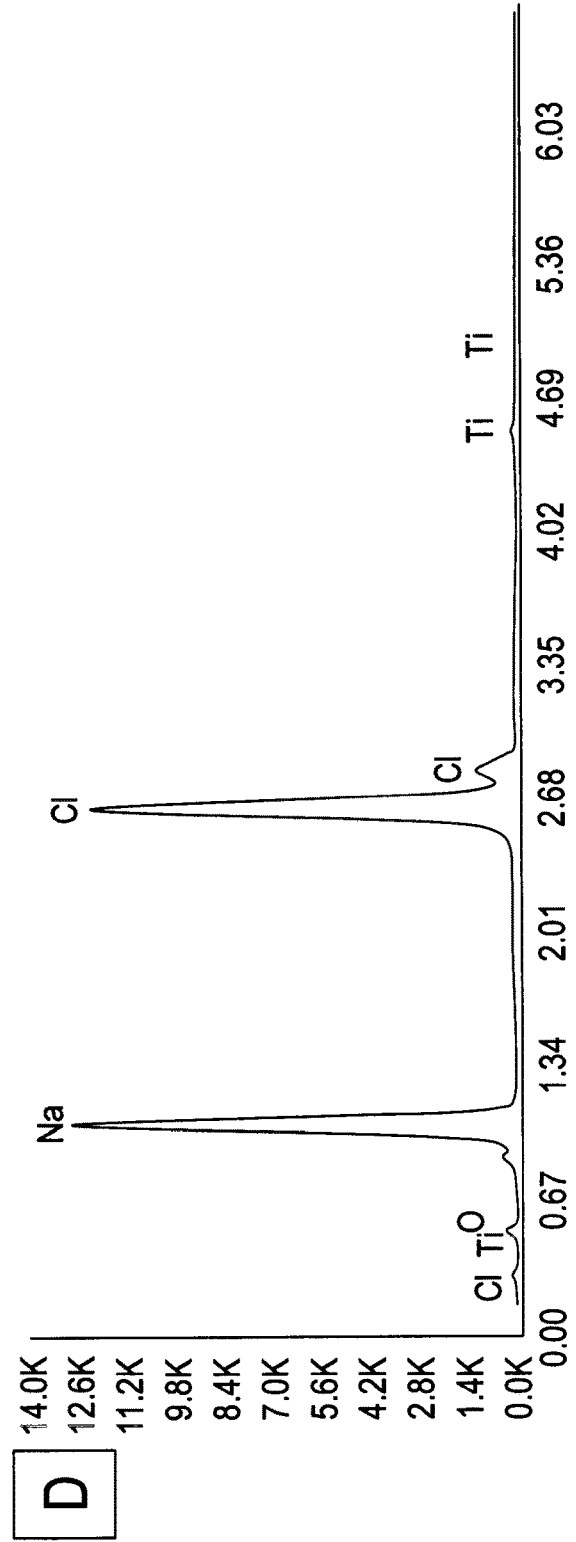

Example 3: Analytical Characterization of NaCl/TiO$_2$ Core/Shell Composite Particles Analytical characterizations were carried out to shed light on the shape and the morphology of cloud seeding NaCl coated TiO$_2$ particles. Different characterization techniques such as X-ray diffraction (XRD), scanning electron microscopy (SEM), energy dispersive X-ray spectroscopy (EDS), Raman spectroscopy, and transmission electron microscopy (TEM) were used. Firstly, the description of the experiment conditions were given. XRD measurements were performed on different NaCl/TiO$_2$ samples using PANalytical (Empyrean) diffractometer. The instrument was operated using Cu Kα X-rays ($\lambda$=0.154 nm) at 45 kV and 40 mA. The measurements of powder sample were achieved in the scattering angle 2θ range of 5° to 90° with a step size of 0.002° and a scan speed of 0.04°/s.

TEM investigations were carried out on Tecnai from FEI™ Company operating at 200 KV. Optimized powder of NaC/$TiO_2$ composite was dispersed in isopropanol solvent and applied to 3 mm Cu grids with carbon film. Raman experiments were conducted on NaCl and $TiO_2$ alone, then on NaCl sample coated with $TiO_2$ using Witek alpha 300 with 532 nm excitation line and beam energy of 75 mW. The adsorption isotherms of water vapor were measured quantitatively by means of Belsorp MAX (Belsorb Max, Japan). A special water vapor adsorption chamber was mounted on the instrument, and the port system of the Belsorp Max was heated to 100° C. during the measurement to prevent condensation of water vapor on the inner wall of the apparatus. The samples were evacuated at 200° C. for 3 hours under a pressure<$10^4$ Torr before commencing the analysis. The water vapor adsorption isotherms of the NaCl/$TiO_2$ composites required 3 days to be obtained.

The optimized NaCl cubic crystals were used to prepare sub-micron NaCl/$TiO_2$ composites. These composites were assessed by XRD in order to confirm the presence of $TiO_2$ and their crystalline phase. XRD diffractogram of NaCl and $TiO_2$ are shown in FIGS. 5(*a*) and (*b*), respectively. XRD patterns of NaCl are in agreement with the fact that NaCl has a cubic crystal structure. However, $TiO_2$ is present in only two of its crystal forms: anatase and rutile as it can be seen from the acquired XRD patterns. In order to determine the grain size, Scherrer's equation was used as given by this relationship:

$$D = \frac{\kappa\lambda}{\beta\cos\theta}$$

Where D is the diameter of the grains supposed to be disk like-shape

κ is the shape factor (most used value is 0.9)

λ is the wavelength of the X-ray

θ is the Bragg's angle

β is the size of Full Width Half Maximum (FWHM)

The average grain size was determined based on the highest intensity peak of $TiO_2$ anatase (101) diffraction peak. The value of the 2θ peak for (101) is 25.4° and the FWHM corresponding to this peak is 1.4°. The grain size of $TiO_2$ anatase is 6.6 nm was obtained. The XRD patterns in FIG. 5(*c*) give the crystalline structure of NaCl—$TiO_2$ composite sample and show both NaCl and $TiO_2$ peaks, it is noted that the intensity of $TiO_2$ peaks is very low compared to NaCl peaks. FIG. 5(*c*) shows the presence of a peak at approximately 25.50° which is characteristic of the $TiO_2$ anatase phase (101). These results confirm the presence of $TiO_2$ in the material.

FIG. 6 shows there is no Raman signal for pure NaCl pure powder (b). However Raman spectrum in the range of [0-800] $cm^{-1}$ is clearly visible for $TiO_2$ sample (a). A peak with high intensity is centered at 152.19 $cm^{-1}$ and three other peaks with lower intensity were also visible at 402.72, 519.83 and 641.39 $cm^{-1}$. The spectrum analysis shows that $TiO_2$ exists in the form of anatase phase as also observed elsewhere. A similar experiment performed at the same conditions was conducted on a composite sample NaCl made of submicron-particles of NaCl coated by $TiO_2$ layer. The Raman spectrum plotted in FIG. 6(*c*) is similar to the one observed for pure $TiO_2$ with little count indicating the presence of $TiO_2$ layer on the inner surface of NaCl as the Raman spectroscopy experiments were conducted on the surface of the sample.

The sub-micron NaCl crystals were coated with $TiO_2$, the resultant NaCl/$TiO_2$ composites were used as cloud seeding particles to enhance the water vapor adsorption and the formation of rainfall droplets. SEM and EDS techniques were combined to confirm the presence of the coating on optimized NaCl crystals. First the size distribution of coated particles was examined after the coating procedure. It is clearly seen that the cubic crystalline structures of the coated crystals were well maintained as well as the homogeneous submicron size distribution FIG. 7(*a*). The statistical analysis showed that all the crystals in this sample (100%) have a size less than 1 μm. In addition, the elemental composition analysis using EDS spectrum indicated the presence of sodium, chloride, oxygen and most importantly, titanium FIG. 7(d). This demonstrated that the NaCl crystals were successfully coated with $TiO_2$. To identify the thickness of the coated $TiO_2$ layer, TEM analysis took place. Results obtained showed a thin layer of $TiO_2$ surrounding NaCl cubes with average thickness of 20 nm. FIG. 7(b) shows a typical NaCl and $TiO_2$ composite. The micrograph shows clearly the presence of $TiO_2$ layer on the outer surface of the particle. FIG. 7(c) is the closer image that was used to measure the coating thickness (20 nm) on the particle surface.

Figure 8:
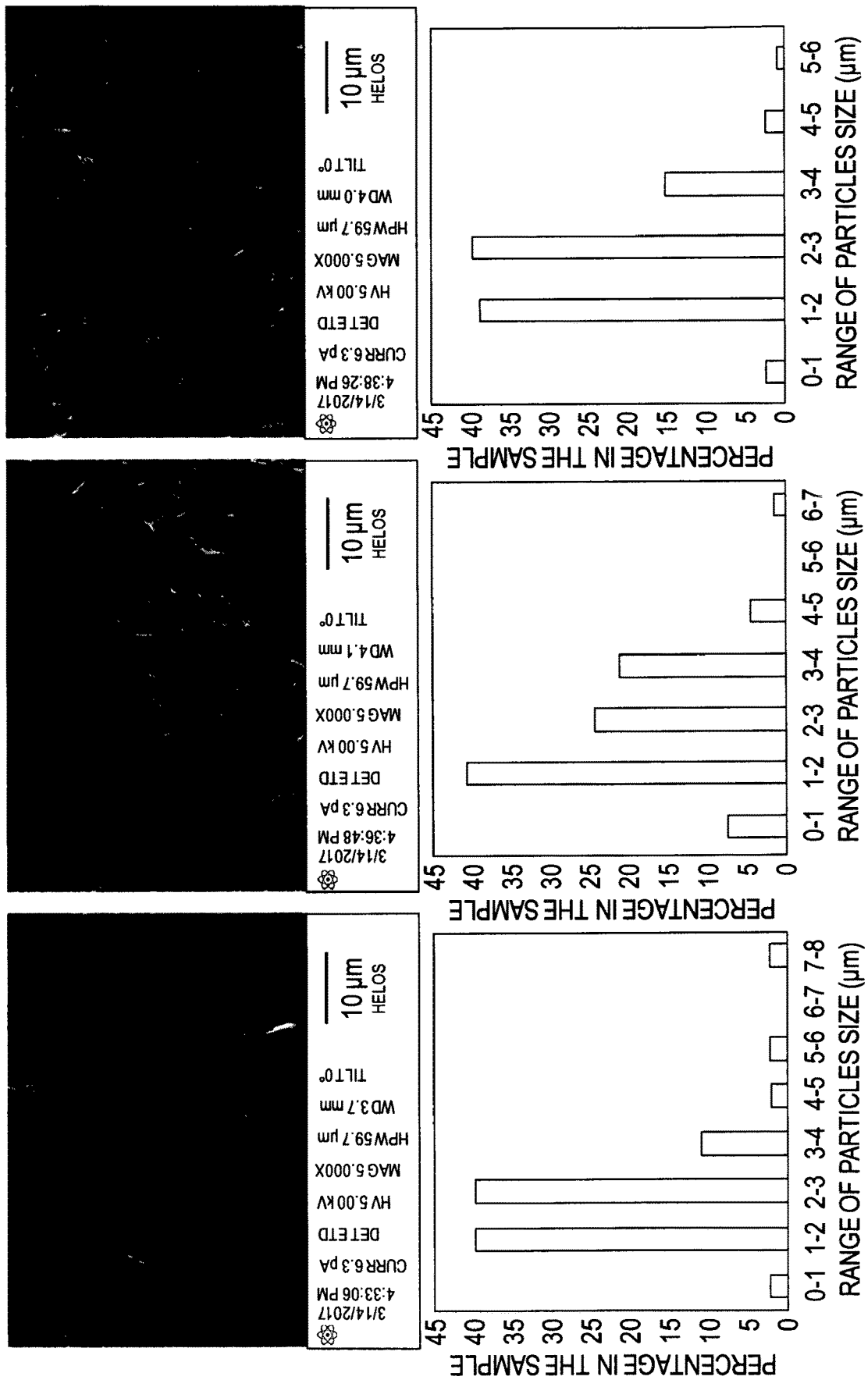
FIG. 8 illustrates SEM images and size distribution of $NaCl/TiO_2$ particles according to embodiments of the present invention.
Figure 9:
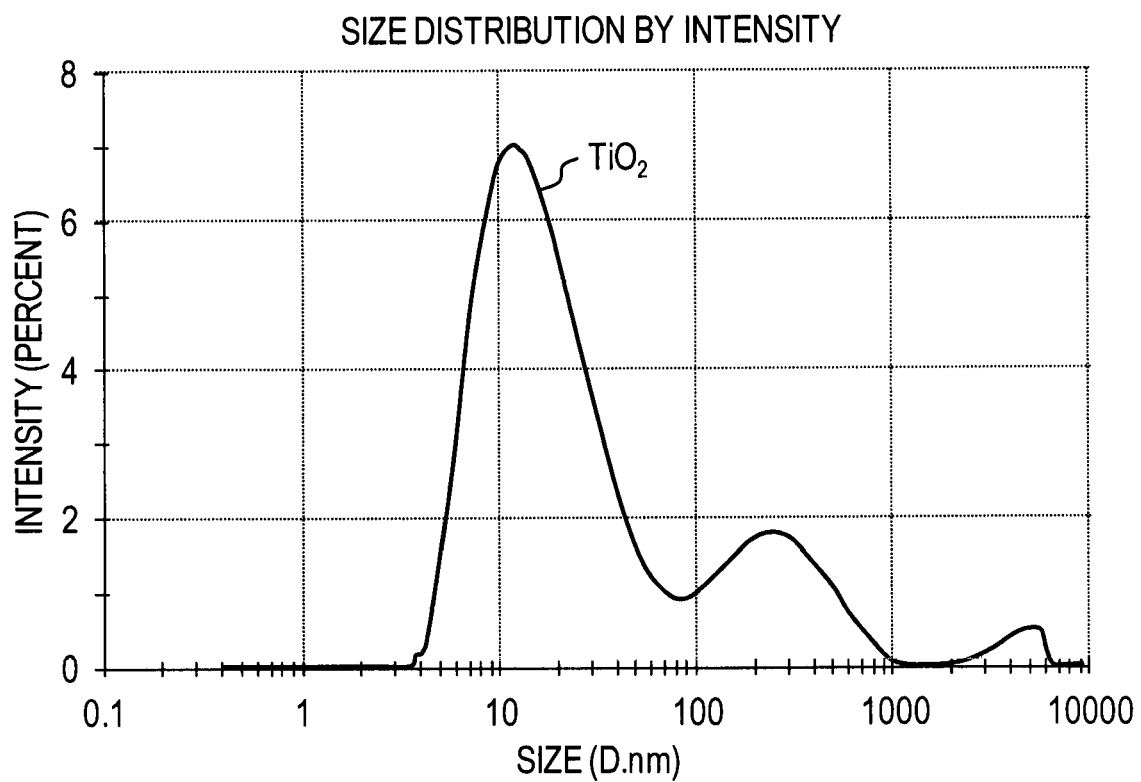
FIG. 9 illustrates the size distribution of $TiO_2$ sol in ethanol according to embodiments of the present invention.

FIG. 8 illustrates SEM images and size distribution of NaCl/$TiO_2$ particles from the same sample. FIG. 9 illustrates the size distribution of a $TiO_2$ sol in ethanol, which was to be used for coating purposes, as measured by a zeta potential analyzer.

Example 4: Water Adsorption Efficiency and Capacity of NaCl/$TiO_2$ Composites

To quantitatively assess the water adsorption efficiency and capacity of the new NaCl/$TiO_2$ composites, water vapor adsorption isotherm measurements were carried out by using Belsorp Max instrument for both NaCl/$TiO_2$ composite samples. Apart from the pure salt crystals, composite samples with different concentrations of $TiO_2$ were prepared; NaCl/1.25% $TiO_2$, NaCl/2.5% $TiO_2$ and NaCl/5% $TiO_2$. Their specific water adsorption capacity were determined and compared. The obtained results are shown in FIG. 10.

Figure 10:
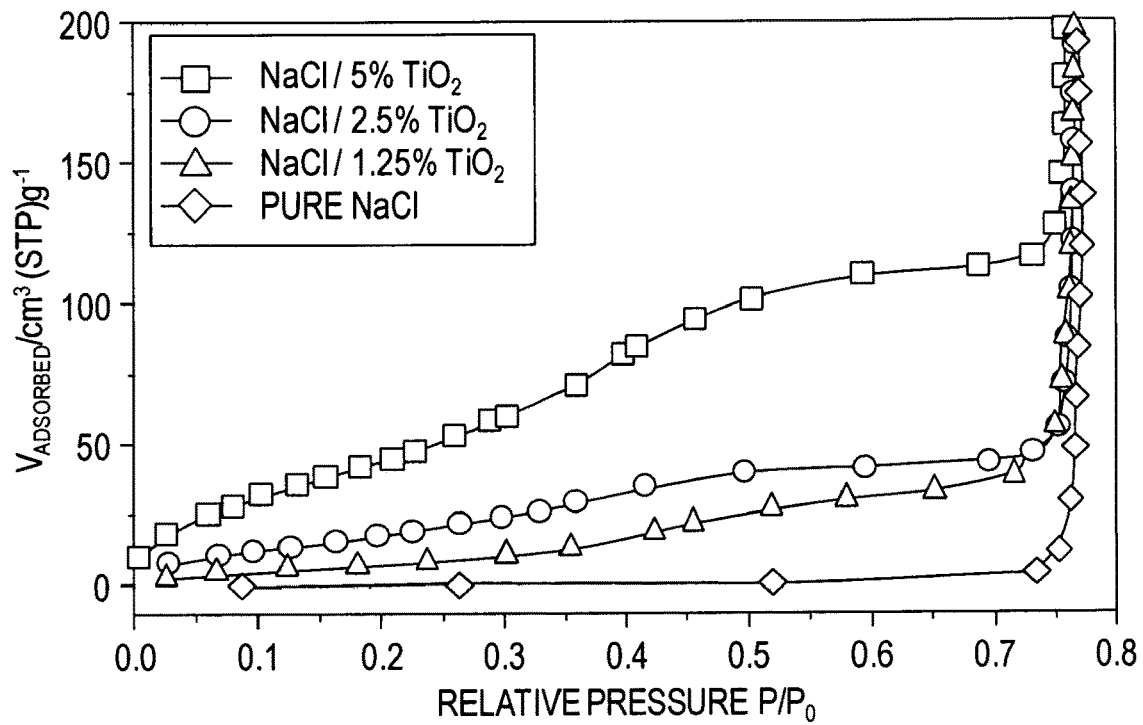
FIG. 10 illustrates a comparison of water vapor adsorption isotherms for salt/$TiO_2$ composites with different percentages of $TiO_2$ according to embodiments of the present invention.

It was found that water adsorption isotherms of NaCl/$TiO_2$ composites were very different from pure NaCl, and demonstrated an on-going adsorption of water vapor at very low vapor concentration as well as at high vapor concentration, whereas pure NaCl crystals could adsorb water vapor only at very high vapor concentration (FIG. 10). NaCl/$TiO_2$ composites had a significantly higher water adsorption capacity. In comparison to pure NaCl that had a water vapor adsorption volume of 0.37 $cm^3/g$ only, the specific water adsorption capacities of NaCl/1.25% $TiO_2$, NaCl/2.5% $TiO_2$ and NaCl/5% $TiO_2$ were 9.15 $cm^3/g$, 19.05 $cm^3/g$ and 47.72 $cm^3/g$ respectively. Composites having NaCl/5% $TiO_2$ demonstrated the highest volume of adsorbed water vapor, which was 129 times more of adsorption than pure NaCl.

FIG. 10 illustrates the isotherm of pure NaCl. The graph in FIG. 10 shows no water vapor adsorption when relative pressures were below 0.75, after this value a huge amount was adsorbed. Without wishing to be bound to any particular theory, it is believed that pure salt exhibited very low hygroscopicity (in anhydrous form) at the low to medium relative water vapor pressure and its hygroscopic point could not be reached, as a result, it stayed as dry salt crystals. It started to adsorb large amounts of water vapor only when their hygroscopic point was finally reached (in hydrous form), and the dry salt crystals were then transformed into a mixture of crystals and saturated solution, followed by becoming a saturated solution, and at last resulted in adsorbing a large quantity of water vapor and forming an unsaturated dilute solution. When the pure NaCl crystals are used as cloud seeding materials, they might only be effective to condense water vapor and form water droplets if cloud water vapor pressure is relatively high ($P/P_o$>0.75). In this case, the cloud seeding may be more dependent on the cloud condition, and the chance of successful rain fall will be low.

In contrast, the isotherms of all NaCl/$TiO_2$ composite samples rose steeply across a wide range of water vapor pressures. Without wishing to be bound to any particular theory, this improvement is believed to be explained by referring to their hygroscopic point, which is defined as the value of minimum water vapor concentration needed to carry an adsorption. The addition of $TiO_2$ to the surface layer of salt crystal enhanced the hygroscopic properties and significantly altered the hygroscopic point of the NaCl/$TiO_2$ composites, i.e., $TiO_2$ coating provided a hydrophilic surface that assisted in building up the water vapor pressure above the composite crystals, based on the definition of the hygroscopic point (eq. 1), the increased water vapor pressure reduced the hydroscopic point, that explained why on-going water vapor adsorption occurred for NaCl/$TiO_2$ composites.

The results in FIG. 10 also suggest that hydrophilic $TiO_2$ loadings of the composite samples were positively proportional to the increase in the water vapor adsorption capacity, i.e., when the $TiO_2$ loading was increased, the specific water vapor adsorption capacity of the NaCl/$TiO_2$ was increased, this was due to that the $TiO_2$ nanoparticles presented in the composite contributed in adsorption of the water vapor. The NaCl/5% $TiO_2$ particle showed optimal enhancement of the adsorption by effectively increasing the vapor pressure so as to reduce the hydroscopic point, and resulted in more efficient hygroscopic water vapor condensation. Without wishing to be bound to any particular theory, the remarkable improvement in water vapor adsorption is believed to be caused by a synergistic effect between hydrophilic $TiO_2$ particles and hygroscopic NaCl crystals. The obtained results of water vapor adsorption suggest that the submicron-sized NaCl/$TiO_2$ composites were able to adsorb water vapor more easily and also adsorb in greater quantity. It is anticipated that when these composites are used as cloud seeding materials in the rain enhancement practice, these properties may aid in producing more efficient rain droplet formation.

TABLE 1

Specific Water Vapor Adsorbed Volumes by Pure Salt and NaCl/$TiO_2$ Composites.

| Sample | Water vapor volume adsorbed/$cm^3/g$ |
| --- | --- |
| Pure NaCl | 0.37 |
| NaCl/1.25% $TiO_2$ | 9.15 |
| NaCl/2.5% $TiO_2$ | 19.05 |
| NaCl/5% $TiO_2$ | 47.72 |

Example 5: Water Adsorption Efficiency and Capacity of NaCl/$SiO_2$ Composites

Figure 11:
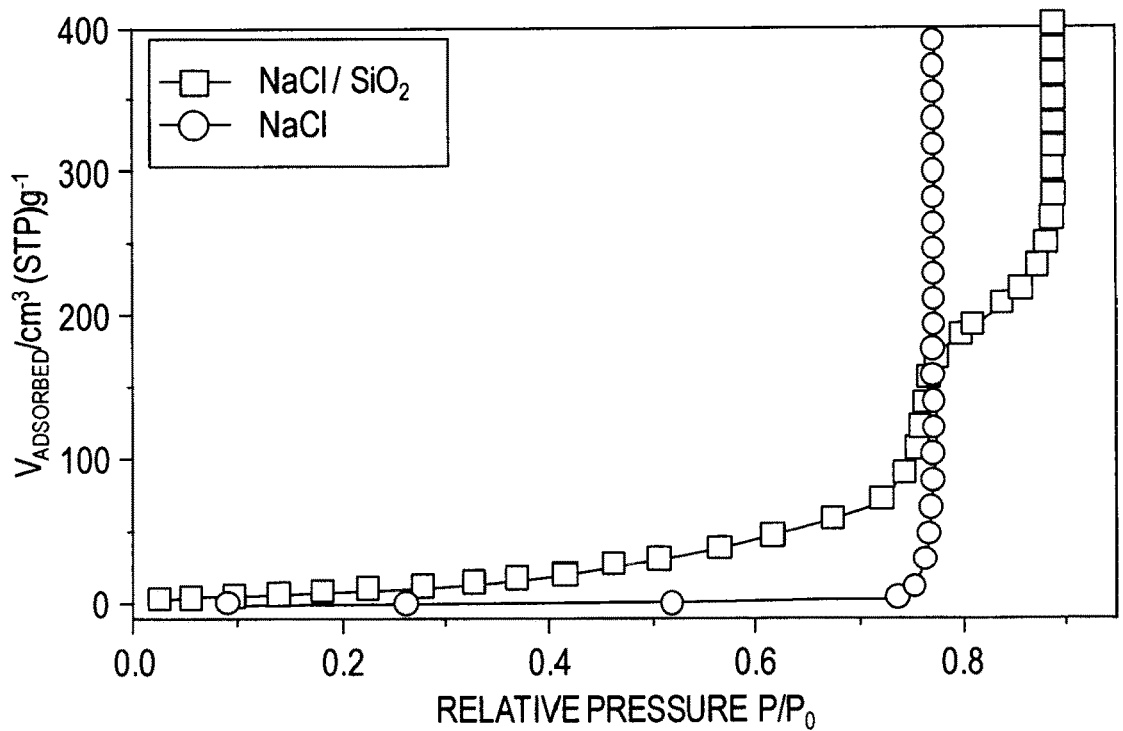
FIG. 11. illustrates a comparison of water vapor adsorption isotherms for $NaCl/SiO_2$ composites according to embodiments of the present invention.

NaCl/$SiO_2$ core/shell particles were prepared by first hydrolyzing tetraethyl orthosilicate (TEOS) to obtain a $SiO_2$ sol following a coating procedure as described in Example 2. The NaCl/$SiO_2$ particles also demonstrated improved water vapor adsorption capacity with early adsorption starting from lower relative humidity (25%, FIG. 11). Comparing the adsorbed water vapor volume of the composite to pure salt (NaCl), it was found that NaCl/$SiO_2$ adsorbed a total of 11 $cm^3/g$ of water vapor, which is 32 times higher than volume adsorbed by pure salt. These results suggest that NaCl/$SiO_2$ can be a suitable alternative for cloud seeding applications.

The foregoing is illustrative of the present invention, and is not to be construed as limiting thereof. The invention is defined by the following claims, with equivalents of the That which is claimed is:

1. A particle comprising a core and a shell, wherein the core comprises sodium chloride and/or potassium chloride and the shell consists essentially of titanium dioxide and/or silicon dioxide, and the shell covers the core and has a thickness between about 5 nm and about 50 nm.

2. The particle of claim 1, wherein the core is hygroscopic and the shell is hydrophilic.

3. The particle of claim 1, wherein the shell is present in amount of about 0.5% to about 20% by weight of the particle.

4. The particle of claim 1, wherein the particle has a water vapor adsorption capacity that is greater than the water vapor adsorption capacity of an uncoated chloride salt particle a pure chloride salt particle and/or a particle consisting of a chloride salt of the same or substantially the same size.

5. The particle of claim 1, wherein the particle has a water adsorption capacity of at least about 1 $cm^3/g$ to about 100 $cm^3/g$.

6. The particle of claim 1, wherein the particle adsorbs water when in an environment having a relative water vapor pressure in a range of about 0.1 $P/P_0$ or greater.

7. The particle of claim 1, wherein the shell comprises amorphous titanium dioxide and/or crystalline titanium dioxide.

8. The particle of claim 1, wherein the particle has a hygroscopic point that is decreased compared to an uncoated chloride salt particle, a pure chloride salt particle and/or a particle consisting of a chloride salt.

9. A coated particle configured for water adsorption, the coated particle comprising:
   a core formed of at least one of sodium chloride and potassium chloride; and
   a coating covering the core to form the coated particle, the coating consisting essentially of at least one of titanium dioxide and silicon dioxide and having a thickness between about 5 nm and about 50 nm.

10. The coated particle of claim 9, wherein the thickness is about 20 nm.

11. The coated particle of claim 9, wherein the coating is a hydrophilic surface.

12. The coated particle of claim 9, wherein the coating is between about 1.5% and about 5% by weight of the particle.

13. The coated particle of claim 9, wherein the core is formed of sodium chloride and the coating is formed of titanium dioxide.

14. The coated particle of claim 9, wherein a water adsorption capacity of the coated particle is at least about 0.37 $cm^3/g$.

15. The coated particle of claim 14, wherein the water adsorption capacity is between about 1 $cm^3/g$ and about 100 $cm^3/g$.

16. The coated particle of claim 9, wherein the coating includes at least one of crystalline silicon dioxide and crystalline titanium dioxide.

17. A coated particle configured for water adsorption, the coated particle comprising:
    a core comprising at least of sodium chloride and potassium chloride; and
    a coating covering the core and comprising at least one of titanium dioxide and silicon dioxide, wherein a thickness of the coating is between about 5 nm and about 50 nm.

18. The coated particle of claim 17, wherein the thickness is about 20 nm.

19. The coated particle of claim 17, wherein the coating is present in amount of about 0.5% to about 20% by weight of the particle.

20. The coated particle of claim 19, wherein the amount is between about 1.5% and about 5% by weight of the particle.

* * * * *